United States Patent
Zhao

(10) Patent No.: US 8,290,896 B2
(45) Date of Patent: Oct. 16, 2012

(54) STATISTICAL APPLICATIONS IN OLTP ENVIRONMENT

(75) Inventor: Lin Zhao, Hangzhou (CN)

(73) Assignee: Alibaba Group Holding Limited, Grand Cayman, KY (US)

( * ) Notice: Subject to any disclaimer, the term of this patent is extended or adjusted under 35 U.S.C. 154(b) by 234 days.

(21) Appl. No.: 12/600,990

(22) PCT Filed: Nov. 7, 2008

(86) PCT No.: PCT/US2008/082845
§ 371 (c)(1),
(2), (4) Date: Nov. 19, 2009

(87) PCT Pub. No.: WO2009/062067
PCT Pub. Date: May 14, 2009

(65) Prior Publication Data
US 2010/0223227 A1   Sep. 2, 2010

(30) Foreign Application Priority Data

Nov. 7, 2008 (CN) .......................... 2007 1 0188104

(51) Int. Cl.
*G06F 17/30* (2006.01)
(52) U.S. Cl. .................. 707/607; 707/688; 707/689
(58) Field of Classification Search .................. 707/607, 707/688, 689
See application file for complete search history.

(56) References Cited

U.S. PATENT DOCUMENTS

| | | | |
|---|---|---|---|
| 5,903,893 A | 5/1999 | Kleewein et al. | |
| 6,466,931 B1 | 10/2002 | Attaluri et al. | |
| 6,487,641 B1 | 11/2002 | Cusson et al. | |
| 6,668,253 B1 * | 12/2003 | Thompson et al. | 1/1 |
| 7,089,228 B2 | 8/2006 | Arnold et al. | |
| 7,099,863 B2 | 8/2006 | Bird et al. | |
| 7,395,258 B2 | 7/2008 | Altinel et al. | |

(Continued)

FOREIGN PATENT DOCUMENTS

CN    1307585 A    8/2001

(Continued)

OTHER PUBLICATIONS

Chinese Office Action mailed Jul. 26, 2011 for Chinese patent application No. 200710188104.X, a counterpart foreign application of U.S. Appl. No. 12/600,990, 11 pages.

*Primary Examiner* — Robert Beausoliel, Jr.
*Assistant Examiner* — Noosha Arjomandi
(74) *Attorney, Agent, or Firm* — Lee & Hayes, PLLC

(57) ABSTRACT

The present disclosure provides a method of statistical application in an OLTP environment to reduce the intensive computational load of invoking SQL statements for statistical calculations. The method introduces a time element into statistical records, and use the time element to determine the time status of previously computed statistical records. Upon receiving a query for a statistical record, the system first searches for an existing copy of the statistical record, and checks the time status of the statistical record if found. The system sends the statistical record to the inquirer if the record exists and is unexpired, and invokes an SQL statement to compute the statistical record only if the record does not exist or has expired. The statistical records may be placed in statistical table in a database and/or a cache of an application server. The disclosed strategy may also increase attack resistance of the system.

19 Claims, 5 Drawing Sheets

U.S. PATENT DOCUMENTS

| | | |
|---|---|---|
| 7,418,453 B2 * | 8/2008 | Chowdhary et al. .................. 1/1 |
| 7,464,069 B2 | 12/2008 | Chen et al. |
| 7,464,077 B1 | 12/2008 | Baunach et al. |
| 7,467,131 B1 | 12/2008 | Gharachorloo et al. |
| 2002/0035673 A1 | 3/2002 | Roseborough et al. |
| 2004/0193656 A1 | 9/2004 | Pizzo et al. |
| 2005/0065944 A1 | 3/2005 | Gunther et al. |
| 2005/0108204 A1 * | 5/2005 | Gordon ............................. 707/3 |
| 2005/0177590 A1 | 8/2005 | Chen et al. |
| 2005/0256822 A1 | 11/2005 | Hollingsworth |
| 2006/0129564 A1 * | 6/2006 | Shah et al. ....................... 707/10 |
| 2006/0136504 A1 * | 6/2006 | Babutzka et al. ............. 707/201 |
| 2006/0271557 A1 | 11/2006 | Harward et al. |
| 2007/0088715 A1 * | 4/2007 | Slackman et al. ............ 707/100 |
| 2007/0124276 A1 | 5/2007 | Weissman et al. |
| 2007/0136323 A1 * | 6/2007 | Zurek et al. .................... 707/100 |
| 2007/0282837 A1 * | 12/2007 | Klein ................................ 707/7 |
| 2008/0208804 A1 * | 8/2008 | Lin ................................... 707/3 |
| 2009/0099898 A1 * | 4/2009 | Ehrman et al. .................... 705/9 |

FOREIGN PATENT DOCUMENTS

| | | |
|---|---|---|
| CN | 1588369 A | 3/2005 |
| CN | 1632793 A | 6/2005 |

* cited by examiner

STATISTICAL APPLICATIONS IN OLTP ENVIRONMENT

RELATED APPLICATIONS

This application is a National Stage of International Application No. PCT/US08/82845, filed Nov. 7, 2008, entitled "STATISTICAL APPLICATION IN OLTP ENVIRONMENT", claiming priority from Chinese patent application No. 200710188104.X, filed Nov. 9, 2007, entitled "METHOD AND SYSTEM FOR STATISTICAL APPLICATIONS IN OLTP ENVIRONMENT", which applications are hereby incorporated in their entirety by reference.

TECHNICAL FIELD

The present disclosure relates to the fields of computer network applications, and particularly to methods and systems of statistical applications in an Online Transaction Processing (OLTP) environment.

BACKGROUND

Computer applications have penetrated into all fields for a long time. Using computer networks for processing e-commerce and statistical applications has become the trend of the modern business. One example of statistical applications is to use a statistical table, which is a summary table based on the statistics of a base table. In a high-availability OLTP environment, the base table usually has a tremendous amount of data and is changing continuously. A record in the statistical table is updated according to certain rules to fulfill the access needs of the application. The statistical table allows prompt and convenient access to real-time information and can perform real-time monitoring. But such benefits require more stringent criteria for the statistical table applications.

In an OLTP environment, a system base table is an underlying table that actually stores metadata for a specific database. A user normally computes a real-time statistics based on the underlying table that has a relatively large number of records according to certain rules. In the beginning, this type of statistical strategy was able to satisfy the needs of the applications, and provide acceptable functionalities. However, as the number of users increases, the number of visits on a website increases exponentially and as a result the frequency of executing a statistical SQL (Structural Query Language) statement rises rapidly. Moreover, since the average number of records being scanned in each statistical computation increases, the average cost for each execution of an SQL statement performing a statistical function continues to rise. One example is the statistics of member reviews in a large e-commerce website. For users of a relatively high-star rating (e.g., high review rating by the other members), this kind of statistics may become extraordinarily complicated. If the number of reviews of a user is high, a database performance issue may arise when a large number of users are viewing the review results of the user displayed on a webpage at the same time, or when the web page displaying the review results is maliciously refreshed. As a result, the web page requested by the users may not be displayed even after a long period of time, resulting in poor user experience. Another example is monitoring the number of abnormal logon behaviors of a user. Under malicious logon attacks, the number of records in a base table that records logon operations of the user may reach hundreds of thousands in a short period of time. The statistical SQL that determines in real time whether a logon of the user is normal will be executed slower and slower as the number of logon attacks increases. A queue of a database server becomes longer, and the queue for connection pool also increases because an application server does not receive returned result from a database promptly. This results in a crash in the application server.

One of the prominent characteristics of OLTP in existing technologies is its frequent execution of SQL statements. Some of these SQL statements are called for completing statistical functions and are characterized by a high CPU (Central Processing Unit) occupation and a particularly high number of logical and physical reads. If the execution of these statements has reached to a certain frequency, functionalities of the database system may deteriorate, and responses of the application system to user requests become slower.

In an OLTP environment, high number of page views may be unavoidable. As described above, since computing statistics directly on the base table consumes a large amount of CPU time and has a relatively high number of logical and physical reads, the workload of the database server may always stay high. Moreover, one quite severe disadvantage of this method is that the system may have weak resistance to attacks. For a large e-commerce website, for example, if a user frequently refreshes statistics web page or continues to maliciously logon, the performance of database system may be affected, and the reliability as well as the consistency of an entire business system may be reduced.

Therefore, the traditional methods that compute statistics directly on the base table are starting to fail to meet the needs of business development, and may need to be changed urgently.

SUMMARY

The present disclosure provides a method of statistical application in an OLTP environment to reduce the intensive computational load of invoking SQL statements for statistical calculations, and to improve the reliability and consistency of an entire business system for a better user experience. The disclosed strategy for statistical applications may also increase attack resistance and improve the reliability of the entire system.

The method introduces a time element into statistical records, and use the time element to determine the time status of previously computed statistical records. Upon receiving a query for a statistical record, the system first searches for an existing copy of the statistical record, and checks the time status of the statistical record if found. The system sends the statistical record to the inquirer if the record exists and is unexpired, and invokes an SQL statement to compute the statistical record only if the record does not exist or has expired. The statistical records are placed in statistical table in a database and/or a cache of an application server.

One aspect of the present disclosure is a method of statistical application in an OLTP environment. The method queries a database containing a statistical table to determine if a statistical record having a record identity exists. If the statistical record exists, the method checks a time element of the statistical record to determine if the statistical record has expired; if the statistical record has not expired, the method sends the statistical record to an inquirer; and if the statistical record does not exist or has expired, the method invokes an SQL statement to compute the statistical record.

In one embodiment, the database is stored in a database server. The database may be a part of an e-commerce system, and the statistical record may contain statistical data of a user of e-commerce system. An application server may be used to send a query to the database. In this embodiment, the method may first determine if the statistical record exists in a cache of the application server prior to querying the database. If the statistical record exists in the cache, the method determines if the statistical record in the cache has expired; and if the statistical record in the cache has not expired, the method sends the statistical record in the cache to an inquirer.

The time element of the statistical record may have a time marker indicating when the statistical record was last updated or created. The time element of the statistical record may further have a threshold time span counting from a time when the statistical record was last updated or created to the present time of inquiry. The time marker can be saved in a data field of the statistical record.

The record identity of the statistical record may have a keyword, and accordingly the querying of the database may be done with a query word matching the keyword. In this case, the time element of the statistical record may have a preset time marker corresponding to the keyword of the statistical record.

In one embodiment, upon invoking the SQL statement to compute the statistics, the method inserts the computed result of the SQL statement into the statistical table to update or create the statistical record. When an application server is used, the method may cache the computed result into the application server to create or update a copy of the statistics record therein.

In another embodiment, the method of statistical application in an OLTP environment first queries an application server having a cache memory storing a statistical table to determine if an unexpired copy of the requested statistical record exists in the statistical table. If yes, the method returns the statistical record to an inquirer; and if the statistical record does not exist or has expired, the method then queries a database server for the statistical record.

Another aspect of the present disclosure is a system of statistical application in an OLTP environment. The system has a database hosted in a database server, the database containing a statistical table having a plurality of statistical records each having a record identity and a time element. The system also has query means for querying the database for a requested statistical record among the plurality of statistical records; and logic means for making the following decisions: if the requested statistical record is found, check a time element of the statistical record to determine if the statistical record has expired; if the statistical record has not expired, send the statistical record to an inquirer; and if the statistical record does not exist or has expired, invoke an SQL statement compute the requested statistical record. The system has computing means for executing the invoked SQL statement, and for creating or updating the requested statistical record in the statistical table of the database. In one embodiment, the system further has query means for querying a cache in an application server for a copy of the requested statistical record; and logic means for making similar decisions.

Yet another aspect of the present disclosure is drawn to one or more computer readable media having stored thereupon a plurality of instructions that, when executed by one or more processor(s), causes the processor(s) to perform the acts of the processes described herein.

Compared to existing technologies, the method and system disclosed herein potentially have several advantages. The method and the system are based on a statistical strategy built upon a statistical table and not completely on a base table. This design can reduce workload of an OLTP database system, increase attack resistance, and improve the reliability of the system as a whole.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

DESCRIPTION OF DRAWINGS

The detailed description is described with reference to the accompanying figures. In the figures, the left-most digit(s) of a reference number identifies the figure in which the reference number first appears. The use of the same reference numbers in different figures indicates similar or identical items.

DETAILED DESCRIPTION

Exemplary embodiments of the disclosed method and system are described in further detail below with reference to figures. In this description, the order in which a process is described is not intended to be construed as a limitation, and any number of the described process blocks may be combined in any order to implement the method, or an alternate method.

Figure 1:
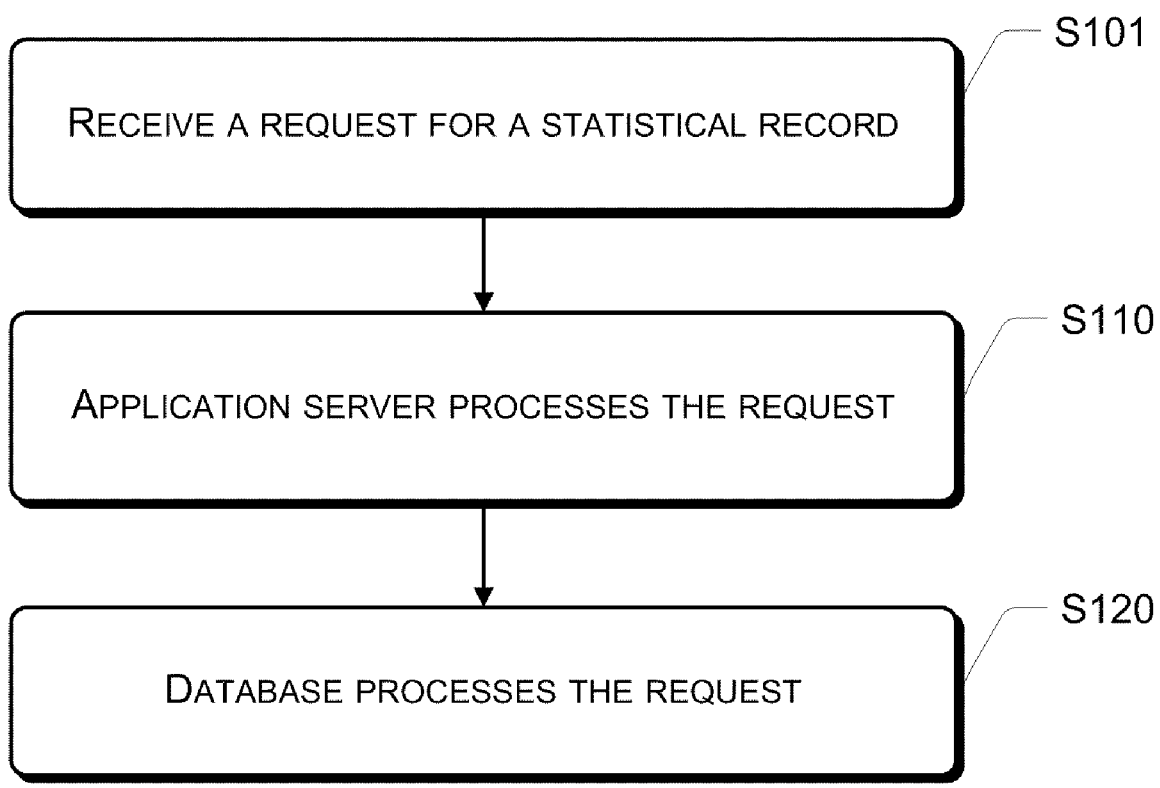
FIG. 1 shows a flow chart of an overall process of an exemplary statistical application in an OLTP environment in accordance with the present disclosure.

FIG. 1 shows a flow chart 100 of an overall process of an exemplary statistical application in an OLTP environment in accordance with the present disclosure.

At block S101, a request for a statistical record is received. The request may be initiated by an end-user who is requesting a certain statistic result or statistic data contained in a statistical record. A user request is usually converted to an internal query sent to an application server or a database server to call for the statistical record. In a conventional SQL-based statistical application, the query is directly sent to the database server containing base data for statistics (e.g., a base table containing tabulated raw data) to invoke an SQL statement, which when executed by the database server, computes the requested statistic result and returns the computed statistic result to the user. In the exemplary process of FIG. 1, however, the query is sent to an application server to be first processed. As will be illustrated further below, the application server contains in a cache copies of the statistical results previously computed.

At block S110, the application server processes the request and determines whether the requested statistical record exists in a cache of the application server. If the statistical record (or a copy thereof) is found in the application server, and has not expired, the application server sends the statistical record to the inquirer (the end-user or another system component making an internal inquiry). If the statistical record does not exist in the cache of the application server or has expired, the application server queries a statistical table in a database on a database server.

As will be shown herein, a time status indicating whether a certain statistical record has expired may be determined using a time element associated with the statistical record. In the application server process S110, the time marker may be set up in the cache of the application server.

In other words, the illustrated embodiment uses a statistical strategy which sets up a cache in the application server and directly returns the statistical record to the inquirer if the statistical record is available at the application server. This strategy conditionally avoids having to invoke an SQL process at the database server in response to every request.

To enable the application server to check the time status (valid or expiration status) of a statistical record, the present disclosure introduces a time element in the statistical record. As is shown below, in one embodiment the time element of the statistical record includes a time marker indicating when the statistical record was last updated or created. A threshold time span counting from a time when the statistical record was last updated or created to the present time of inquiry is also used together with the time marker to determine the time status of the statistical record.

In one embodiment, a time field is added to the regular fields of a statistical table which contains multiple statistical records. The regular fields are based on the attributes or properties of the object of the statistics. For example, the object of the statistics may be a customer which is characterized by multiple attributes or properties such as username, transaction history, activity history, and ratings or feedbacks by the other customers. An exemplary time field is a field for the time at which the statistical record was last updated, referred to as Updated_Time in this document. This additional time field indicates the time of the last update of the statistical resulting object and is a time basis for determining whether the statistical record associated with the particular object of the statistics is valid or expired. An example of a statistical table having multiple fields including an additional time field is shown in Table 1.

TABLE 1

A Statistical Table. Is Built According to Statistical Object

| Primary Key | Aggregate Field A | Aggregate Field B | Aggregate Field C | Aggregate Field D | Updated_Time |
|---|---|---|---|---|---|

In TABLE 1, the primary key may be an identifier or ID of the object of statistics (or statistical object) and is a unique identity of the statistical record associated with the object of statistics. The primary key may contain one or more keywords to make the statistical record searchable. The aggregate fields A, B, C and D can be any attributes or properties which characterize the object of statistics, and are used here only as examples for the purpose of illustration. Other aggregate fields may be added according to characteristics of the object of the statistics and practical business needs.

At block S120, a database server continues the process. The process comes to the database server to execute block S120 only under certain circumstances, for example, when the requested statistical record is either not found in the cache of the application server or found to be expired. In one embodiment, the database server has a database storing a statistical table including multiple statistical records. The database server sets up in advance an expiration time marker for the requested statistical record in the statistical table. The expiration time marker may be associated with the requested statistical record. For example, the expiration time marker may correspond to a keyword of the statistical record. The database server may query for the statistical record in the statistical table based on the keyword of the statistical record.

If the statistical record exists and has not expired, the database server sends the statistical record to the inquirer. The time status of the statistical record may be determined through its corresponding expiration time marker, as described herein. If the statistical record does not exist or has expired, the database server invokes an SQL statement to compute the statistical record. This can be done by scanning a base table of statistical data to obtain the requested statistical record. After obtaining the statistical record as a computed result of executing the SQL statement, the database server inserts or updates the statistical record in the statistical table using the computed result. The statistical record may also be further placed in the cache of the application server. The statistical table of the database server may use one that is illustrated in the TABLE 1.

It is noted that the statistical table may contain multiple statistical records, and each statistical record may has its own expiration time markers. Further, there are may be two instances for a statistical record and its expiration time marker, one in the statistical table of the database server and the other in the cache memory of application server. Preferably, the expiration time markers in the application server and the database server are kept consistent at all times. However, in case where an older version of the statistical record is kept in the cache of the application server and a newer version of the same statistical record exists in the statistical table of the database server, the method and the system would still work, although perhaps less efficiently. In one scenario, the older version in the application server has not expired, and is therefore returned to the user. The user thus receives a slightly outdated statistical record. In another scenario, the older version in the cache has expired, so the query is processed by the database server, and as a result the newer version is returned to the user. This does not affect the freshness of the statistical record received by the user, but may slightly affect the intended efficiency of the overall system, because if the cache of the application server had been timely updated, the request would have been successfully processed at the application server level and would not reach the database server at all.

The above described application server level process and database level process are further described in detail below.

Figure 2:
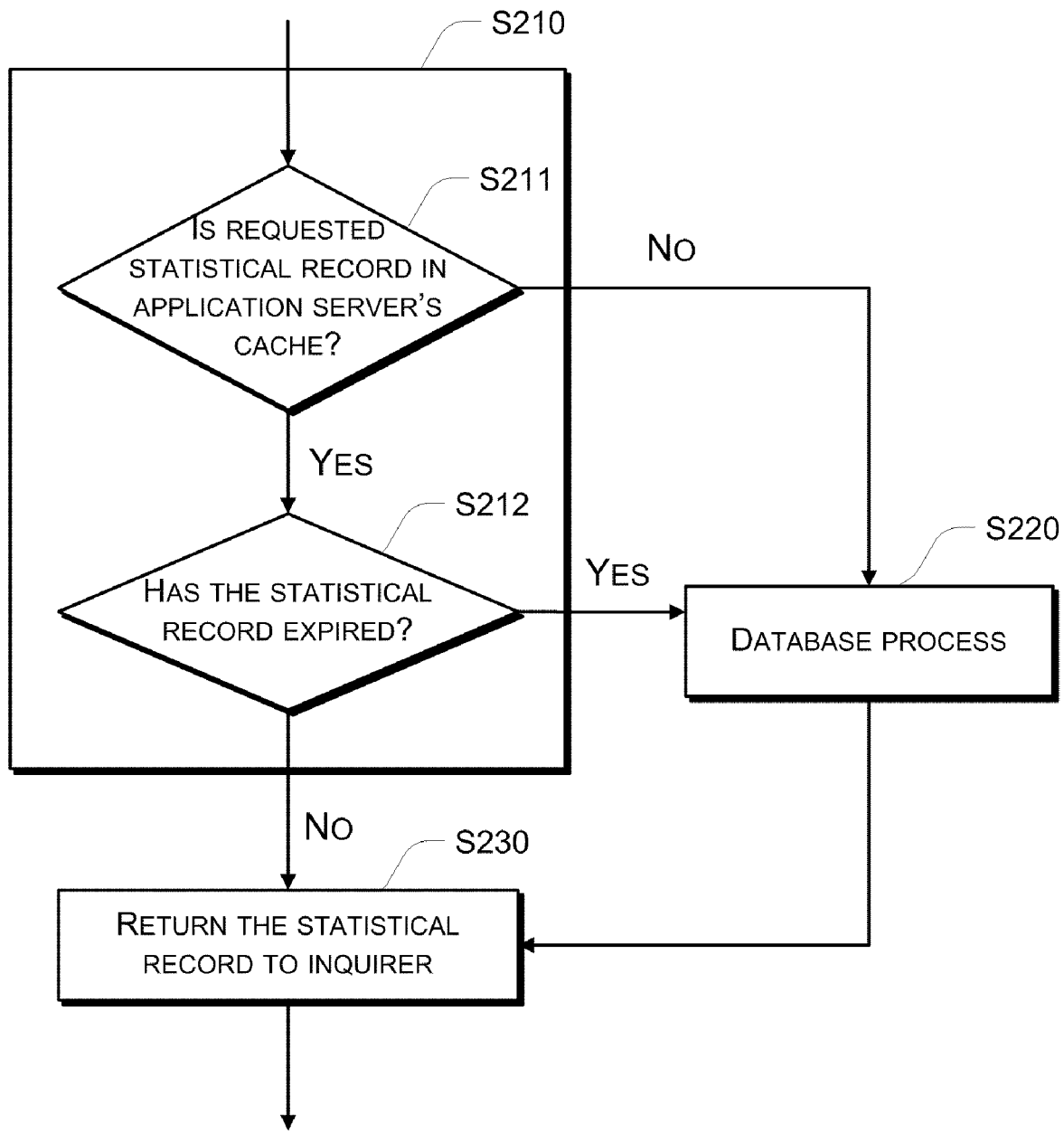
FIG. 2 shows a flow chart of an application server process in an exemplary statistical application.

FIG. 2 shows a flow chart 200 of an application server process in an exemplary statistical application.

As discussed above, the process at the application server provides an opportunity to fulfill the request without calling the database server if certain conditions are met. In this case, the statistical record may be returned directly from the application server to the user without accessing the database server.

Block 210 represents the query process at the application server level. This block includes two sub blocks S211 and S212 each representing a step of query.

At block S211, the application server determines whether a statistical record requested by a user is in a cache of the application server. If the statistical record exists in the cache, the process continues to block S212. If not, the process proceeds to block S220.

At block S212, the application server determines whether the requested statistical record has expired. The act in this block takes place only when the requested statistical record has been found in the cache of the application server. If the statistical result has expired, the process continues to block S220. If the data has not expired, the process proceeds to block S230.

In one embodiment, as previously illustrated with reference to FIG. 1 and TABLE 1, each statistical record has a time field containing an entry Updated_Time indicating the time when the present statistical record was most recently updated. In combination with the update time, the system for the statistical application may set a threshold for the maximum time span counting from the update time to the present time for a statistical record to be still found valid or not expired. This expiration threshold is not required to be identical to the expiration threshold used by the database server for determining the time status of the statistical record in the database. Preferably, however, the expiration threshold in the application server and the expiration threshold in the database server should not conflict with each other as to lead to results that are contradictory to each other. There is much flexibility in setting up the expiration threshold(s). For example, a universal expression threshold applicable for all statistical records in the same statistical table may be used. However, if necessary, different statistical records, or different groups of statistical records, may be given different expiration thresholds. The expiration threshold in the application server may be set by the application server itself, set by the database server, or set by an independent controller which controls both the application server and the database server. The expiration threshold in the application server may be set to be static, or dynamically adjusted through communications with the database server or a separate central controller.

Block S220 represents the query process at the database server stage. This process is explained in further detail below with reference to FIG. 3.

And block S230, the statistical record is sent to the inquirer. In this description, an inquirer may either be another component of the system or an actual human user of the system.

The above process of the application server may be described using the following pseudo-codes:

```
if (the statistical record exists in the cache of the application server) then
{
if (current system time – Updated_Time ≧ threshold) then
the statistical record in cache has expired, call database;
else
the statistical record in cache is valid, send to user;
end if;
}
else
call database;
end if;
```

If the statistical record in the cache of the application server has expired or the record does not exist in the cache of the application server, a statistical strategy of the database is called.

Figure 3:
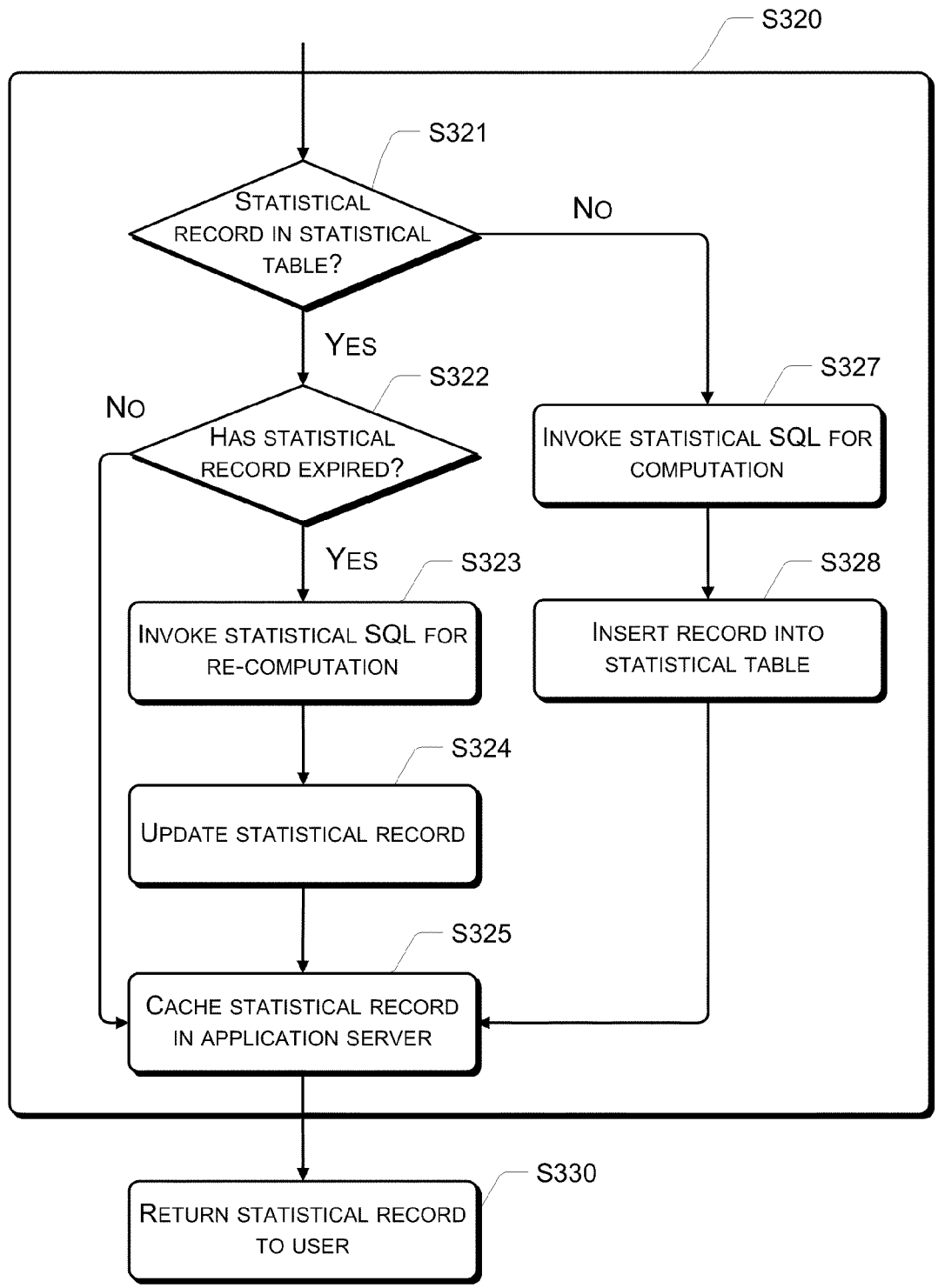
FIG. 3 shows a flow chart of a database server process in an exemplary statistical application.

FIG. 3 shows a flow chart 300 of an exemplary database server process. The process S320 is an exemplary embodiment of block S220 of FIG. 2. The processes initiated by a query sent from the application server as described in FIG. 2. Alternatively, this process can be initiated by a query sent directly from an inquirer without first going through the application server.

At block S321, a database server queries for a requested statistical record in a statistical table of a database in the database server. The query may be conducted according to a primary key field of the statistical record, as shown in TABLE 1. The primary key field functions as an ID of the statistical record. If the primary key field has a keyword, the query may be keyword-based.

If the statistical record exists in a statistical table, the process continues to block S322. If the statistical record does not exist, the process proceeds to block S327 to invoke SQL computation.

At block S322, the database server determines whether the statistical record has expired. A method similar to that used for determining the time status of the statistical record in the application server as described with FIG. 2 can be used for this purpose. If expired, the process continues to block S323. If not, the process proceeds to block S325.

At block S323, the database server invokes a statistical SQL statement for re-computation of the requested statistical record. If the record does not exist, the statistical SQL statement is to compute the record for the first time at block S327.

At block S324, the database server updates the statistical record in the statistical table.

At block S325, the database server sends the statistical record to an application server to be cached.

At block S327, after having decided at block S321 that the statistical record does not exist in the database table, the database server invokes a statistical SQL for the computation of the statistical record.

At block S328, the database server inserts the statistical record into the statistical table. The process then returns to block S325.

After the above database server process S320, the process then continues to block S330 to return the statistical record to the inquirer.

In existing technologies, the step of invoking a statistical SQL statement consumes most of the system resources within the entire process. The disclosed method solves this problem by setting up an expiration time field in a statistical table to prescribe an effective life cycle of a statistical record so that the statistical record, once created, can be reused for a certain period of time. This avoids high frequency calling of the SQL routine. The disclosed method establishes a strategic way to access the statistical information. The application server caches the statistical information that has been created so that a number of repetitive accesses may be completed in the application server without accessing the database, thus reducing workload of the database. Even when access to the database is needed, the method does not resort to unconditional calling of SQL computation. Instead, a statistical table may be used as another layer of buffer. Only when the statistical record does not exist in the statistical table, or the statistical record is found to be expired, is the statistical SQL statement invoked to scan a base table for computing the requested statistical result. The computational load of executing SQL statements is thus reduced.

In other words, the system effectively has a two-layer cache or buffer—one layer in the cache of the application server, and the other in the statistical table of the database. Only when both layers fail to provide the requested statistical record would the statistical SQL statement then be invoked to scan the base table for statistical computation. As such, the number of executions of the statistical SQL statements is greatly reduced. For most requests, a hit can generally be found in the cache of the application server, so the attack resistance of the database server is substantially improved. The method is particularly effective for very high frequency requests because in this situation it is the least likely that the statistical record needs to be updated for every request. For infrequently request statistical records, it is likely that the SQL statement of the database server may be necessary to compute the most updated statistical record for every request, but doing so does not create an excessive burden on the database.

Consider an extreme scenario for a statistical table of member reviews. If the rating information of a member has never been requested, the statistical table would not have the statistical record of this member's ratings. Likewise, if the rating information of a user has not been requested for a long time, a statistical record of the ratings is likely to have expired. This statistical record will not be updated until the rating information is requested.

The present disclosure also provides a system of statistical application in an OLTP environment. The system has a database hosted in a database server. The database contains a statistical table having multiple statistical records each having a record identity and a time element. The system also has query means for querying the database for a requested statistical record among the statistical records; and logic means for making the following decisions: if the requested statistical record is found, check a time element of the requested statistical record to determine if the statistical record has expired; if the requested statistical record has not expired, return the statistical record to an inquirer; and if the requested statistical record does not exist or has expired, invoke an SQL statement to scan a base table to obtain the requested statistical record.

In one embodiment, the system further has query means for querying a cache in an application server for a copy of the requested statistical record; and logic means for making the following decisions: if the copy of the requested statistical record is found in the cache, check the time element of the copy of the statistical record to determine if the copy of the statistical record has expired; and if the copy of the statistical record has not expired, send the copy of the statistical record to an inquirer.

The above query means, logic means and computing means can be realized in various ways that are presently available in the art or that may become available in the future. The particular manner in which the query means, logic means and computing means are realized is not an essential part of this disclosure.

Figure 4:
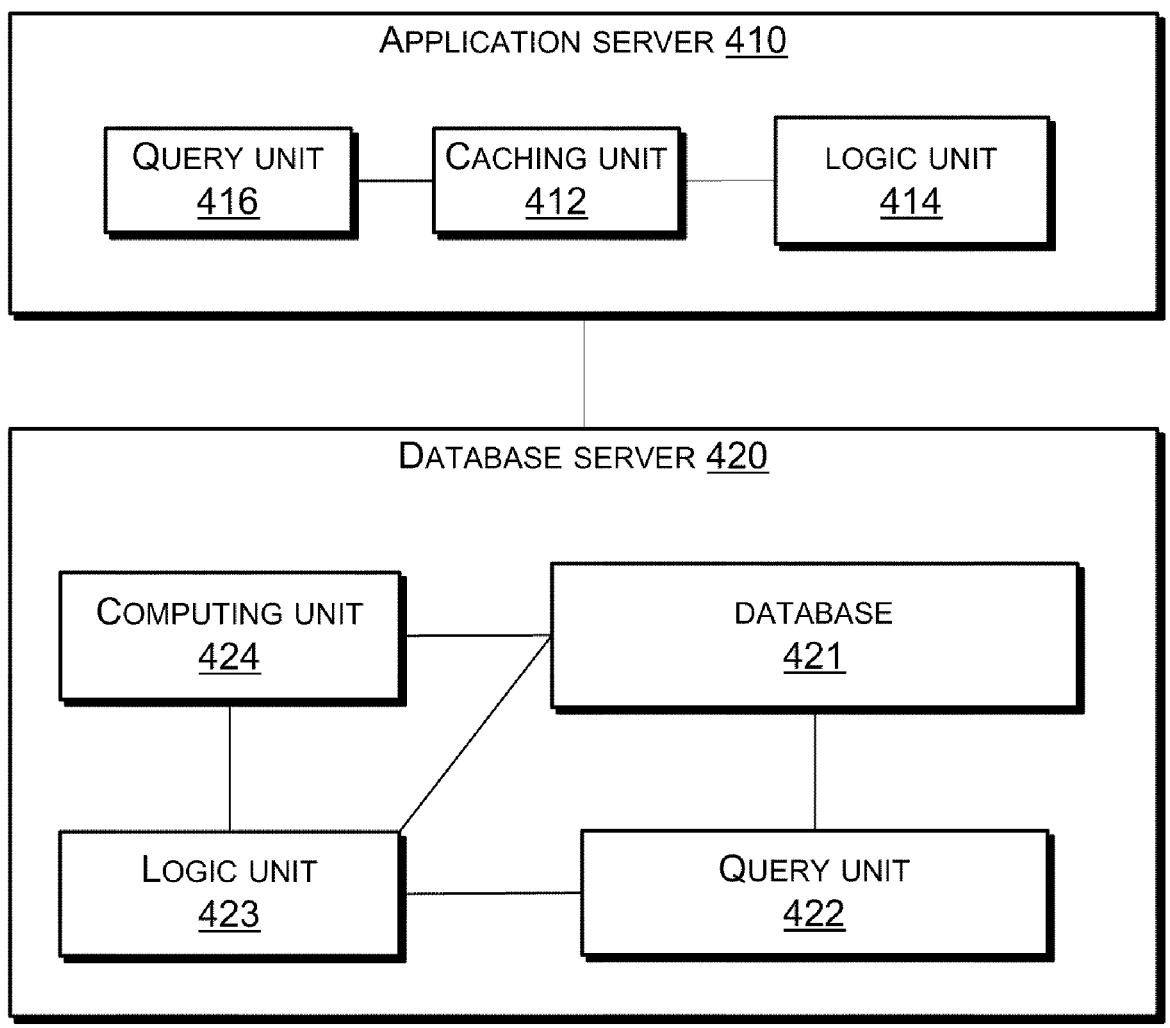
FIG. 4 shows a schematic structural diagram of a system of statistical application in an OLTP environment in accordance with the present disclosure.

FIG. 4 shows a schematic structural diagram of a system 400 of statistical application in an OLTP environment in accordance with the present disclosure. In this disclosure, a "unit" is a device which is a tool or machine designed to perform a particular task or function. A unit or device can be a piece of hardware, software, a plan or scheme, or a combination thereof, for affecting a purpose associated with the particular task or function.

As shown in FIG. 4, the statistical application system 400 includes an application server 410 and a database server 420. The application server 410 has a caching unit 412 storing cached copies of statistical records received from the database server for 20. Upon receiving a user request, a query unit 416 searches the caching unit 412 to determine if the requested statistical record exists among the cached copies of statistical records. A logic unit 414 makes the following determinations: if the statistical record exists, check a time element of the statistical record to determine if the statistical record has expired; if the statistical record has not expired, send the statistical record to the inquirer making the request; and if the statistical record does not exist or has expired, query the database server 420 for the statistical record.

The database server 420 hosts a database 421 that contains a statistical table including statistical records each of which having a record identity and a time element. Query unit 422 is used for querying the database 421 for the requested statistical record in the statistical table. Logic unit 423 for making the decisions is described herein with regard to the database server process.

A computing unit 424 executes the SQL statement to compute the requested statistical record when no unexpired statistical record is found. The computing unit 424 is also used for creating or updating the statistical record in the statistical table of the database 421, and further sending the statistical result to the application server 410 to be cached. The computing unit 424 may also be used for setting up expiration time markers for the statistical records in the statistical table, and for determining whether an expiration time marker of the requested statistical record indicates the record has expired.

Implementation Environment

In the following, an exemplary implementation environment of the method and system is provided to show their implementation and application environment. It is noted that the disclosed method and system can be implemented using either software or hardware only, but preferably should be implemented using a combination of software and hardware. The disclosed method itself can be implemented in the form of software products stored in a storage media. The software includes instructions for a computer device (either stand-alone or networked) to execute the method described in the exemplary embodiments of the current disclosure.

In particular, the above-described techniques may be implemented with the help of a computing device, such as a server or a personal computer (PC) having a computing unit, as illustrated below.

Figure 5:
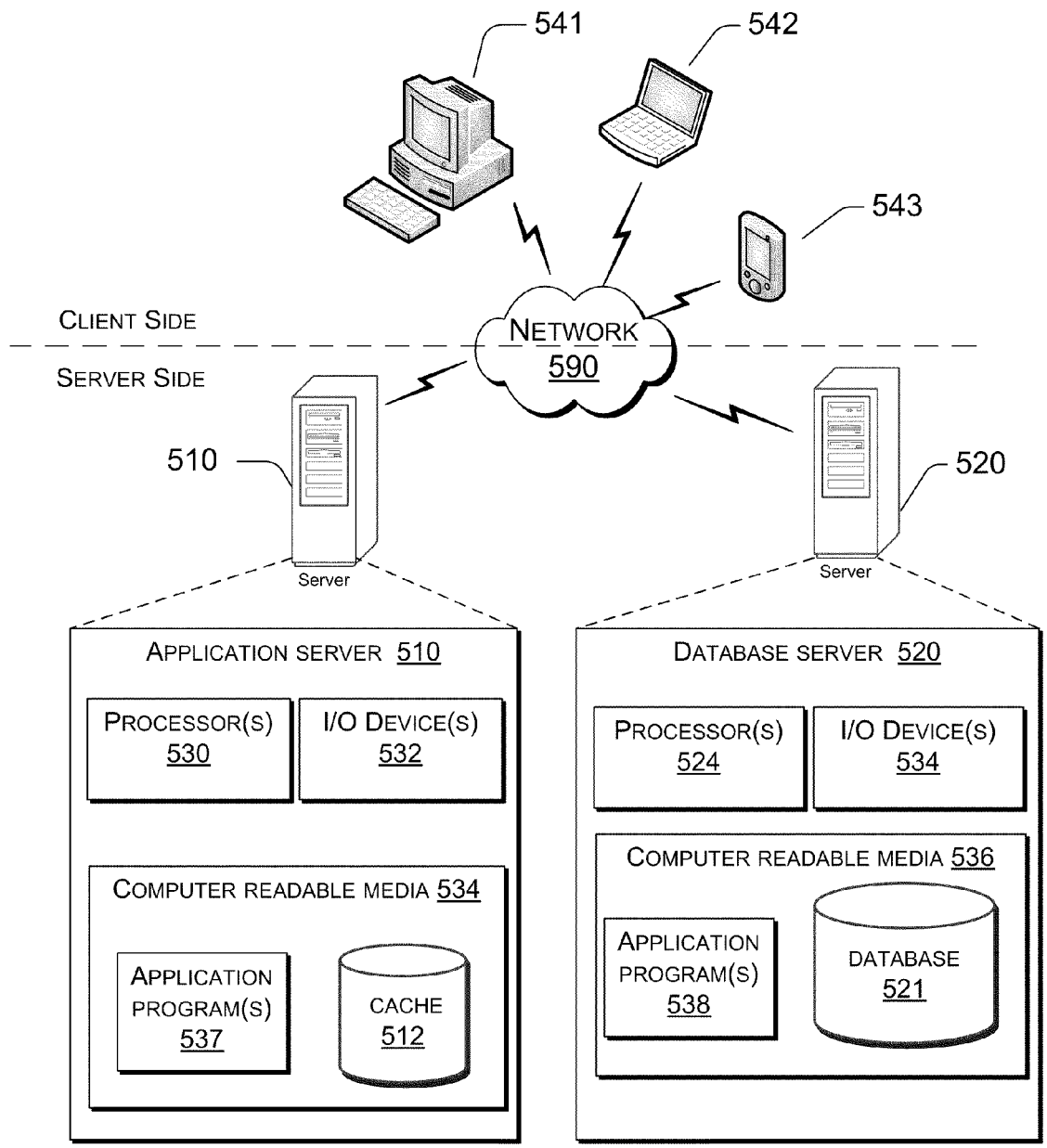
FIG. 5 shows an exemplary environment for implementing the method of the present disclosure.

FIG. 5 shows an exemplary environment 500 for implementing the method of the present disclosure. In the illustrated environment 500, some components reside on a client side and other components reside on a server side. However, these components may reside in multiple other locations. Furthermore, two or more of the illustrated components may combine to form a single component at a single location.

A system of statistical application in an OLTP environment is on the server-side, including application server 510 and database server 520. The application server 510 includes processor(s) 530, I/O devices 532, computer readable media (e.g., memory) 534, and network interface (not shown). The database server 520 includes processor(s) 524, I/O devices 534, computer readable media (e.g., memory) 536, and network interface (not shown). The application server 510 and the database server 520 are connected to client devices 541, 542 and 543 through network 590 (such as the Internet). The client devices 541, 542 and 543 can be any suitable devices, including personal computers, PDAs, and cell phones, for a user to access the application server 510 and the database server 520.

The computer readable media 534 of the application server 510 includes a cache memory 512 to store cached copies of the statistical records received from the database server 520. The computer readable media 534 may also store application programs 537. Similarly, the computer readable media 536 of the database server 520 stores application problems 538 and database 521, which includes a statistical table containing the statistical records as described herein.

Application programs 537 contain instructions which, when executed by processor(s) 530, cause the processor(s) 520 to perform actions of processes carried out by the application server 510, as described herein. Likewise, application programs 538 contain instructions which, when executed by processor(s) 524, cause the processor(s) 524 to perform actions of processes carried out by the database server 520, as described herein.

It is appreciated that the computer readable media may be any of the suitable memory devices for storing computer data. Such memory devices include, but not limited to, hard disks, flash memory devices, optical data storages, and floppy disks.

Furthermore, the computer readable media containing the computer-executable instructions may consist of component(s) in a local system or components distributed over a network of multiple remote systems. The data of the computer-executable instructions may either be delivered in a tangible physical memory device or transmitted electronically.

It is also appreciated that each of the application server 510 and the database server 520 media may be a single server computer or a cluster of servers.

It is appreciated that the potential benefits and advantages discussed herein are not to be construed as a limitation or restriction to the scope of the appended claims.

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. A method of statistical application in an online transaction processing (OLTP) environment, the method comprising:
   determining whether a statistical record exists in a cache of an application server prior to querying a database containing a statistical table, wherein the database is a relational database having tables therein that are formatted in accordance with a corresponding program language;
   responsive to existence of the statistical record, checking a time element of the statistical record to determine whether the statistical record has expired; and responsive to the existence of the statistical record and the statistical record having not expired, sending the statistical record to an inquirer.

2. The method as recited in claim 1, the method further comprising:
   responsive to either the statistical record not existing in the cache or the statistical record in the cache having expired,
   querying the database containing the statistical table to determine whether the statistical record exists in the statistical table, and
   responsive to the existence of the statistical record in the database and the statistical record in the database having not expired, sending the statistical record in the database to an inquirer or responsive to either the statistical record not existing in the database or the statistical record in the database having expired, invoking a statement of the programming language to compute the statistical record.

3. The method as recited in claim 2, wherein the database is stored in a database server, and querying the database comprises:
   sending a query for the statistical record to the database server from an application server.

4. The method as recited in claim 2, the method further comprising:
   indicating when the statistical record was last updated or created with a time marker, wherein the time element comprises the time marker.

5. The method as recited in claim 4, the method further comprising:
   determining whether a count of a time when the statistical record was last updated or created to a present time of inquiry is greater than a threshold time span, wherein the statistical record is expired when the count is greater than the threshold time span.

6. The method as recited in claim 4, the method further comprising:
   saving the time marker in a data field of the statistical record.

7. The method as recited in claim 2, wherein querying the database comprises:
   querying the database with a query word matching a keyword of the statistical record,
   wherein the time element of the statistical record comprises a preset time marker corresponding to the keyword of the statistical record.

8. The method as recited in claim 2, wherein a record identity of the statistical record comprises a keyword, and querying the database comprises: querying the database with a query word matching the keyword.

9. The method as recited in claim 2, wherein the database is a part of an e-commerce system, and the statistical record comprises statistical data of a user of the e-commerce system.

10. The method as recited in claim 2, wherein the programming language is Structural Query Language (SQL) and the statement of the programming language is an SQL statement, the method further comprising:
    inserting or updating the statistical record in the statistical table using a computed result of the SQL statement.

11. The method as recited in claim 10, further comprising:
    sending the computed result to an application server to be cached therein.

12. A method of statistical application in an online transaction processing (OLTP) environment, the method comprising:
    querying a database containing a statistical table to determine whether a statistical record having a record identity exists in the statistical table;
    responsive to existence of the statistical record, checking a time element of the statistical record to determine whether the statistical record has expired;
    responsive to the existence of the statistical record and the statistical record having not expired, sending the statistical record to an inquirer or
    responsive to either the statistical record not existing or the statistical record having expired, invoking a Structural Query Language (SQL) statement to compute the statistical record;
    determining whether the statistical record exists in a cache of an application server prior to querying the database;
    responsive to existence of the statistical record in the cache, determining whether the statistical record in the cache has expired; and
    responsive to determination that the cached statistical record has not expired, sending the cached statistical record to an inquirer.

13. The method as recited in claim 12, wherein determining whether the statistical record in the cache has expired comprises:
    checking the time element of to the statistical record against a threshold time span counting from a time when the statistical record was last updated or created to a present time of inquiry.

14. The method as recited in claim 12, wherein determining whether the statistical record in the cache has expired comprises:
    checking a time marker in a data field of the statistical record in the cache.

15. A method of statistical application in an online transaction processing (OLTP) environment, the method comprising:

prior to querying a database containing a statistical table, wherein database is a relational database having tables therein that are formatted in accordance with a corresponding program language, determining whether a statistical record exists in a cache memory of an application server by:

querying the application server to determine whether a statistical record having a record identity exists among a plurality of statistical records stored in the cache memory, responsive to existence of the statistical record, checking a time element of the statistical record to determine whether the statistical record has expired, and responsive to the existence of the statistical record and the statistical record having not expired, sending the statistical record to an inquirer or responsive to either the statistical record not existing or the statistical record having expired, querying a database server for the statistical record.

16. The method as recited in claim 15, wherein querying the database server for the statistical record comprises:

querying a database of the database server to determine whether the statistical record exists in a statistical table in the database;

responsive to existence of the statistical record in the database, checking the time element of the statistical record to determine whether the statistical record in the database has expired; and responsive to the existence of the statistical record in the database and the statistical record in the database having not expired, sending the statistical record stored in the database to an inquirer or responsive to either the statistical record not existing in the database or the statistical record in the database having expired, invoking an Structural Query Language (SQL) statement to compute the statistical record.

17. A system of statistical application in an online transaction processing (OLTP) environment, the system comprising:

at least one processor;

one or more computer readable media devices having stored thereupon a plurality of instructions that, when executed by one or more processor(s), causes the at least one processor(s) to:

determine whether a statistical record exists in a cache of an application server prior to querying a database containing a statistical table, wherein the database is a relational database having tables therein that are formatted in accordance with a corresponding program language;

responsive to existence of the statistical record in the cache, check a time element of the statistical record to determine whether the statistical record in the cache has expired; and responsive to the existence of the statistical record in the cache and the statistical record in the cache having not expired, send the statistical record to an inquirer.

18. The system as recited in claim 17, wherein, when executed by the at least one processor, the plurality of instructions further causes the at least one processor to:

query the database containing the statistical table to determine whether the statistical record having a record identity exists;

responsive to existence of the statistical record in the database, check a time element of the statistical record in the database to determine whether the statistical record in the database has expired;

responsive to existence of the statistical record in the database and the statistical record in the database having not expired, send the statistical record in the database to an inquirer or responsive to either the statistical record not existing in the database or the statistical record in the database having expired, invoke a Structural Query Language (SQL) statement to compute the statistical record.

19. The as recited in claim 18, wherein, when executed by the at least one processor, the plurality of instructions further causes the at least one processor to: execute the invoked Structural Query Language (SQL) statement; and create or update the statistical record in the statistical table of the database.

* * * * *